(12) United States Patent
Burdis

(10) Patent No.: US 8,228,587 B2
(45) Date of Patent: Jul. 24, 2012

(54) SERIES CONNECTED ELECTROCHROMIC DEVICES

(75) Inventor: Mark Samuel Burdis, Faribault, MN (US)

(73) Assignee: SAGE Electrochromics, Inc., Faribault, MN (US)

( * ) Notice: Subject to any disclaimer, the term of this patent is extended or adjusted under 35 U.S.C. 154(b) by 260 days.

(21) Appl. No.: 12/765,224

(22) Filed: Apr. 22, 2010

(65) Prior Publication Data

US 2011/0260961 A1    Oct. 27, 2011

(51) Int. Cl.
  *G02F 1/153*    (2006.01)
(52) U.S. Cl. ........ 359/265; 359/266; 359/269; 359/270; 359/271; 359/273; 359/274; 427/126.3; 216/24
(58) Field of Classification Search .......... 359/265–275; 427/126.3; 216/24
  See application file for complete search history.

(56) References Cited

U.S. PATENT DOCUMENTS

| | | | |
|---|---|---|---|
| 7,133,181 | B2 | 11/2006 | Greer |
| 7,277,215 | B2 | 10/2007 | Greer |
| 7,372,610 | B2 | 5/2008 | Burdis et al. |
| 7,450,294 | B2 * | 11/2008 | Weidner ........................ 359/275 |
| 7,593,154 | B2 | 9/2009 | Burdis et al. |
| 2003/0227663 | A1 | 12/2003 | Agrawal et al. |
| 2003/0227664 | A1 * | 12/2003 | Agrawal et al. ............... 359/269 |
| 2007/0153355 | A1 * | 7/2007 | Huang et al. .................. 359/265 |
| 2008/0169185 | A1 | 7/2008 | Burdis et al. |
| 2008/0204850 | A1 * | 8/2008 | Agrawal et al. ............... 359/273 |

FOREIGN PATENT DOCUMENTS

| | | |
|---|---|---|
| DE | 19907334 A1 | 8/2000 |
| DE | 102008004942 A1 | 6/2009 |

OTHER PUBLICATIONS

International Search Report and Written Opinion, PCT/US2011/030157 dated Aug. 22, 2011.

* cited by examiner

*Primary Examiner* — Evelyn A. Lester
(74) *Attorney, Agent, or Firm* — Lerner, David, Littenberg, Krumholz & Mentlik, LLP

(57) ABSTRACT

An electrochromic device includes a first electrochromic region interconnected with a second electrochromic region by a plurality of conductive links disposed between sides of a substrate on which the material layers of the electrochromic device are formed. The plurality of conductive links interconnects a first isolated conductive region of the first electrochromic region with a first isolated conductive region of the second electrochromic region. A sequence of a counter electrode layer, an ion conductor layer and an electrochromic layer is sandwiched between the first conductive regions of the first and second electrochromic regions and respective second isolated conductive regions of the first and second electrochromic regions. The second conductive regions of the first and second electrochromic regions are connected to respective first and second bus bars which are for connection to a low voltage electrical source.

26 Claims, 11 Drawing Sheets

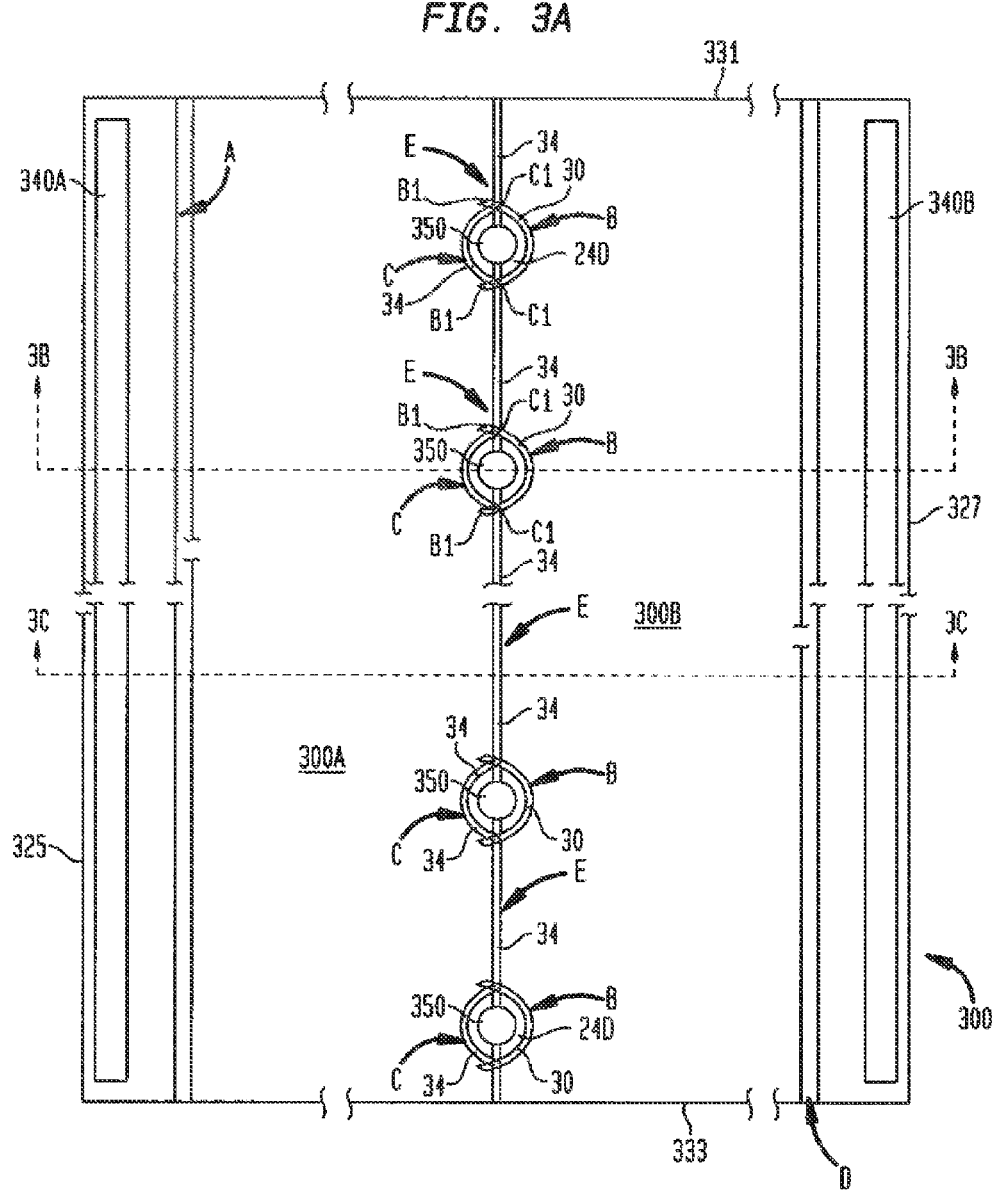

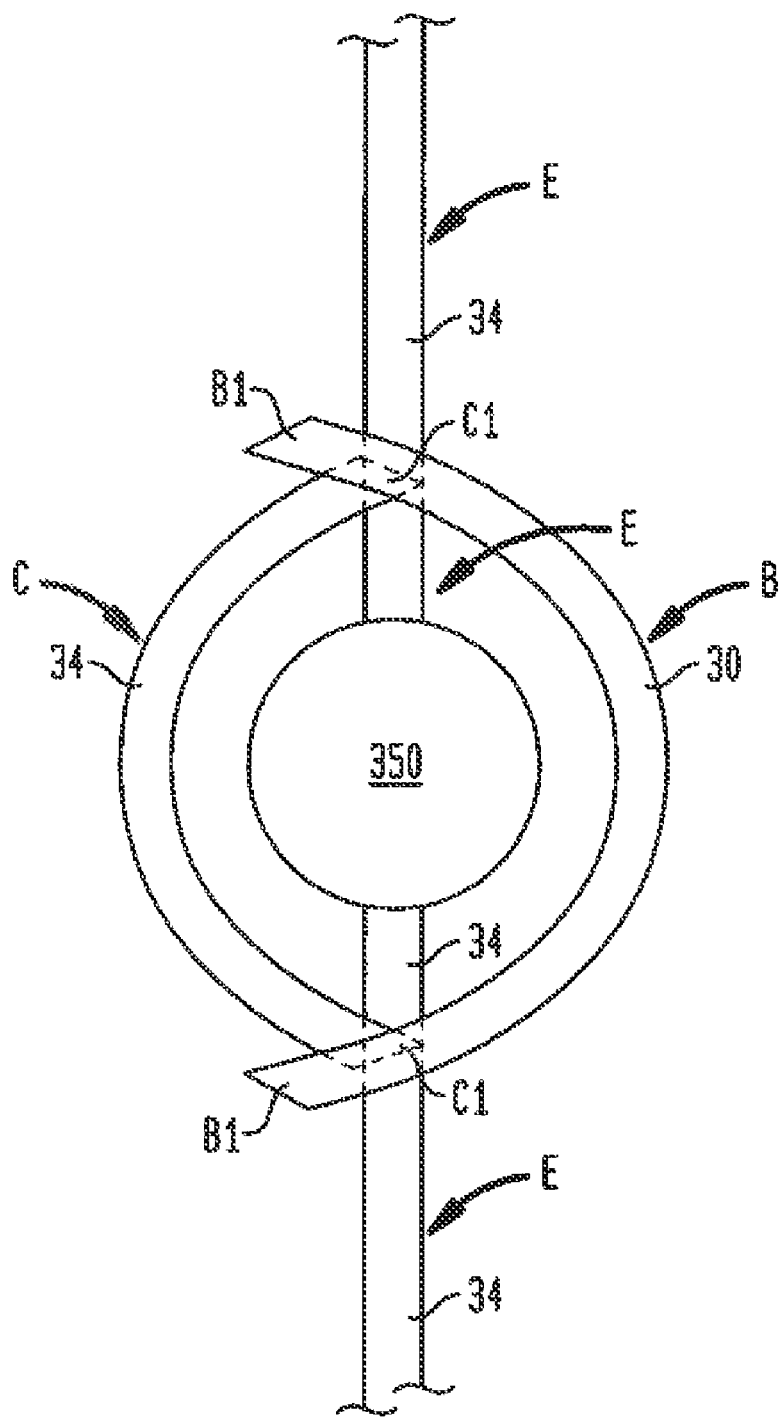

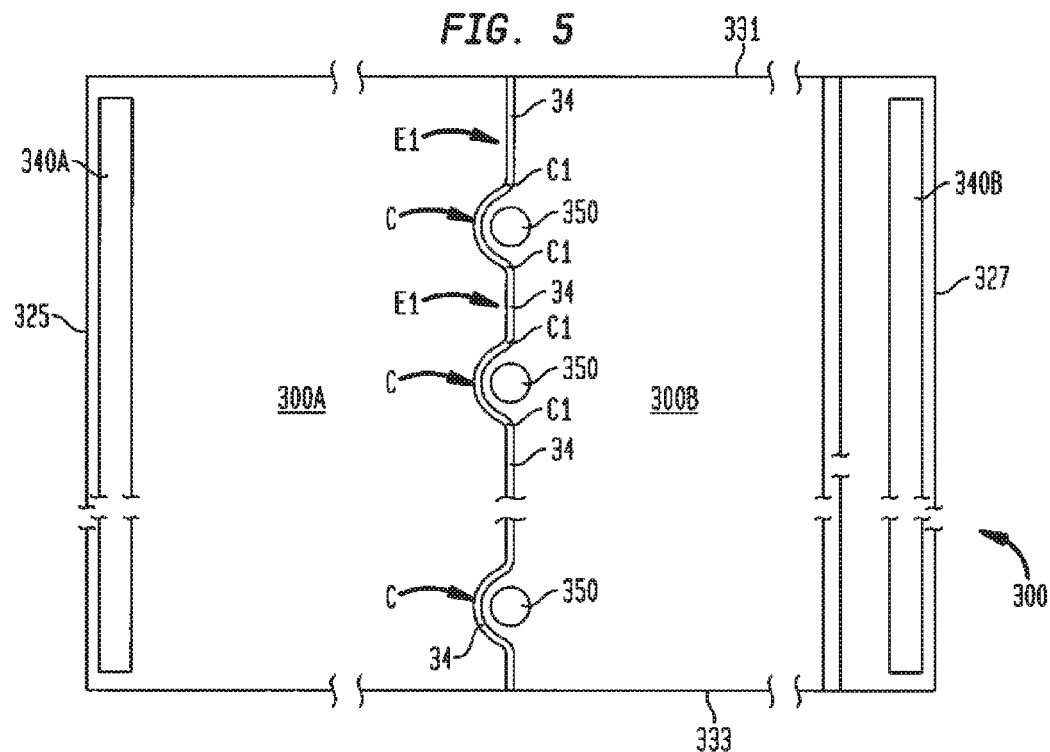
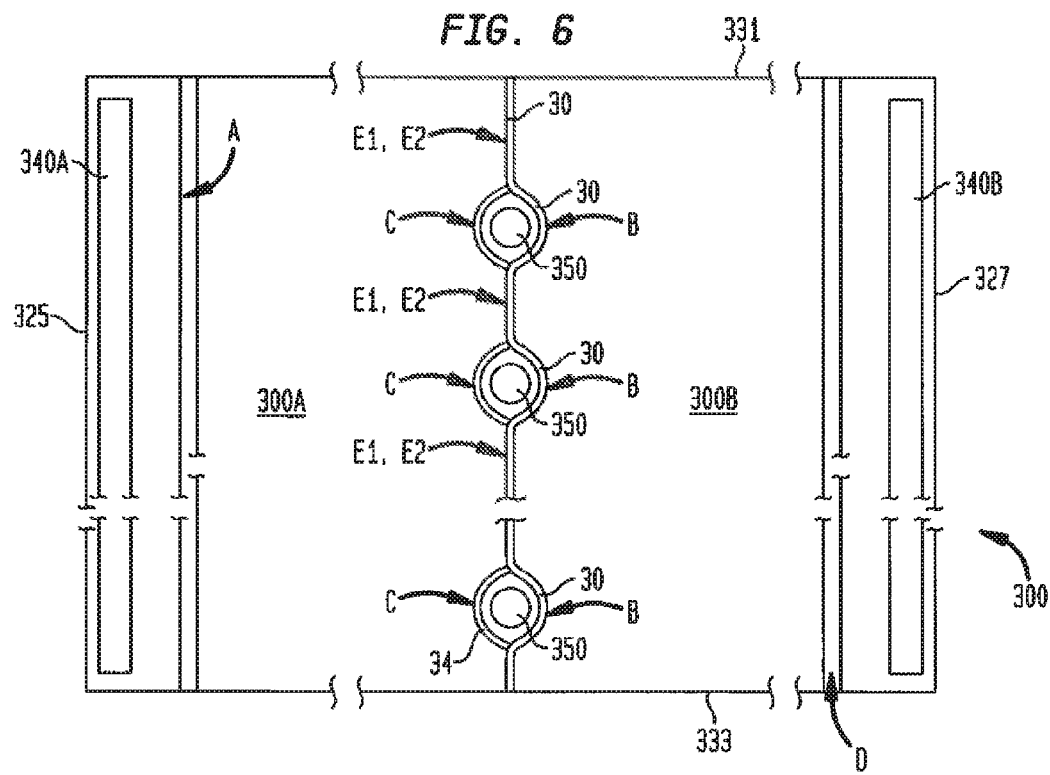

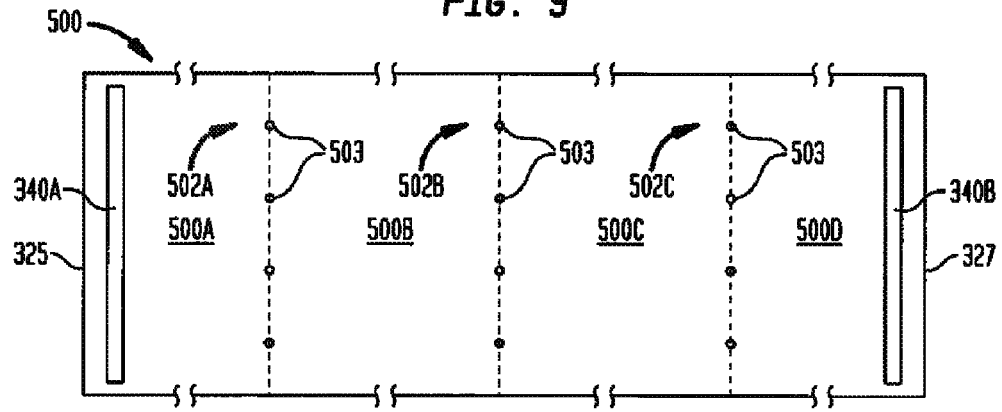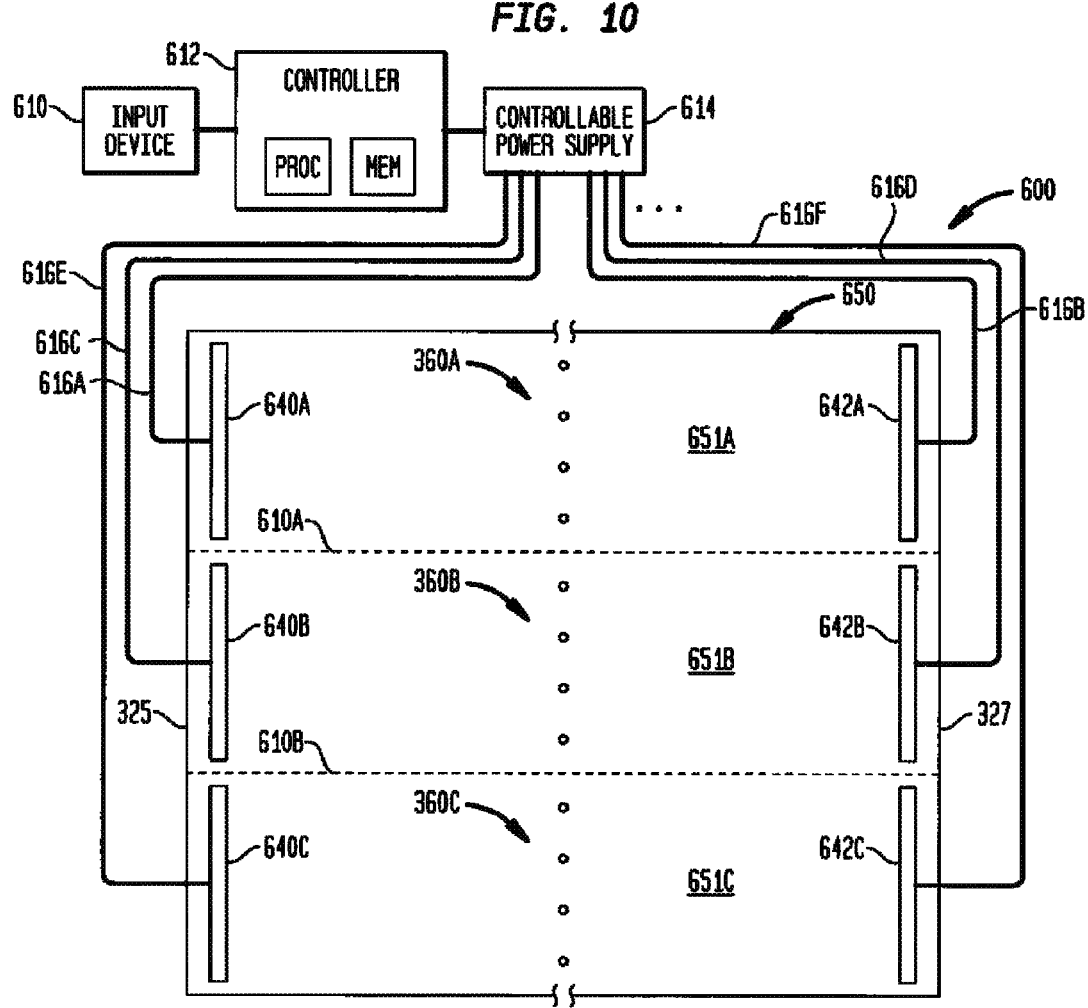

SERIES CONNECTED ELECTROCHROMIC DEVICES

FIELD OF THE INVENTION

This invention relates to electrochromic devices which can vary the transmission or reflectance of electromagnetic radiation by application of an electrical potential to the electrochromic device.

BACKGROUND OF THE INVENTION

Electrochromic devices include electrochromic materials that are known to change their optical properties, such as coloration, in response to the application of an electrical potential, thereby making the device more or less transparent or more or less reflective. Typical prior art electrochromic devices include a counter electrode layer, an electrochromic material layer which is deposited substantially parallel to the counter electrode layer, and an ionically conductive layer separating the counter electrode layer from the electrochromic layer respectively. In addition, two transparent conductive layers respectively are substantially parallel to and in contact with the counter electrode layer and the electrochromic layer. Materials for making the counter electrode layer, the electrochromic material layer, the ionically conductive layer and the conductive layers are known and described, for example, in U.S. Patent Application No. 2008/0169185, incorporated by reference herein, and desirably are substantially transparent oxides or nitrides. When an electric potential is applied across the layered structure of the electrochromic device, such as by connecting the respective conductive layers to a low voltage electrical source, ions, such as Li+ ions stored in the counter electrode layer, flow from the counter electrode layer, through the ion conductor layer and to the electrochromic layer. In addition, electrons flow from the counter electrode layer, around an external circuit including a low voltage electrical source, to the electrochromic layer so as to maintain charge neutrality in the counter electrode layer and the electrochromic layer. The transfer of ions and electrons to the electrochromic layer causes the optical characteristics of the electrochromic layer, and optionally the counter electrode layer in a complementary EC device, to change, thereby changing the coloration and, thus, the transparency of the electrochromic device.

FIGS. 1A and 1B illustrate plan and cross-sectional views, respectively, of a typical prior art electrochromic device 20. The device 20 includes isolated transparent conductive layer regions 26A and 26B that have been formed on a substrate 34, such as glass. In addition, the device 20 includes a counter electrode layer 28, an ion conductive layer 32, an electrochromic layer 30 and a transparent conductive layer 24, which have been deposited in sequence over the conductive layer regions 26. It is to be understood that the relative positions of the electrochromic and counter electrode layers of the device 20 may be interchanged. Further, the device 20 includes a bus bar 40 which is in contact only with the conductive layer region 26A, and a bus bar 42 which may be formed on the conductive layer region 26B and is in contact with the conductive layer 24. The conductive layer region 26A is physically isolated from the conductive layer region 26B and the bus bar 42, and the conductive layer 24 is physically isolated from the bus bar 40. Although an electrochromic device may have a variety of shapes, such as including curved sides, the illustrative, exemplary device 20 is a rectangular device with the bus bars 40 and 42 extending parallel to each other, adjacent to respective opposing sides 25, 27 of the device 20, and separated from each other by a distance W. Further, the bus bars 40 and 42 are connected by wires to positive and negative terminals, respectively, of a low voltage electrical source 22 (the wires and the source 22 together constituting an "external circuit").

Referring to FIGS. 1A and 1B, when the source 22 is operated to apply an electrical potential across the bus bars 40, 42, electrons, and thus a current, flows from the bus bar 42, across the transparent conductive layer 24 and into the electrochromic layer 30. In addition, if the ion conductive layer 32 is an imperfect electronic insulator as is the case in many thin film EC devices, a small current, commonly referred to as a leakage current, flows from the bus bar 42, through the conductive layer 24 and the electrochromic layer 30, and into the ion conductive layer 32. Further, ions flow from the counter electrode layer 28, through the ion conductive layer 32, and to the electrochromic layer 30, and a charge balance is maintained by electrons being extracted from the counter electrode layer 28, and then being inserted into the electrochromic layer 30 via the external circuit. As the current flows away from the bus bar 42 across the conductive layer 24 and towards the bus bar 40, voltage is dropped by virtue of the finite sheet resistance of the conductive layer 24, which is typically about 10-20 Ohms/square. In addition, current flowing across the conductive layer 24 is incrementally reduced, as current is drawn through the combination of the layers 30, 32 and 28 ("stack") to produce the electrochromic coloration in the device 20. Consequently, if the device 20 is considered to be formed from successive adjacent segments arranged between the bus bars 40, 42 and extending between the transparent conductor layer 24 and the conductive layer region 26B, the amount of current flowing through the stack at the segment of the conductive layer 24 closest to the bus bar 40 will be close to zero, as the majority of the current will have passed down through the stack. Assuming that the sheet resistance of the transparent conductive layer 24 is substantially uniform between the bus bars 40 and 42, the voltage drop across the transparent conductive layer 24 extending between the bus bars 40, 42, will be proportional to the current flowing through each successive segment of the device 20. Thus, the rate of voltage drop in the transparent conductive layer with respect to distance away from the bus bar 42 will be at a maximum closest to the bus bar 42 and practically zero close to the bus bar 40. A substantially mirrored image of the current flow occurs with respect to the flow of current from the bus bar 40 across the conductive layer region 26A and toward the bus bar 42, in that the current flow across the device 20 in the conductive layer region 26A increases from the bus bar 40 to the bus bar 42 as a result of contributions from successive segments of the device 20. The difference between the voltage profiles for the conductive layer 24 and the conductive layer region 26A, across the width of the device between the bus bars 40, 42, is the potential difference between the conductive layer 24 and the conductive layer region 26A across the width of the electrochromic device extending between the bus bars 40, 42. The potential difference determines the maximum rate of current flow through each segment from the counter electrode layer 28 to the electrochromic layer 30 causing the device 20 to transform to a colored state and, thus, causing coloring of the device 20. Current will flow at a rate proportional to the potential difference across the segments of the device, provided there is a ready supply of charge, in the form of lithium ions and electrons, to satisfy the requirements. The net result is that a non-uniform coloration is initially produced, with the regions closest to the bus-bars, where the potential difference between the transparent conductors is largest, coloring faster than the region in the middle of the device. In an ideal device, which would not have any leakage current, this non-uniformity will even out as the supply of available charge in the counter electrode layer is exhausted, first closest to the bus-bars, and then in the center of the device, as the electrochromic device attains a fully colored state, thereby yielding uniform coloration across the entire area of the device.

After a voltage is initially applied across the bus bars 40, 42 of the electrochromic device 20, the current flowing through the device 20 will drop towards zero, and thus the voltage drops across each of the transparent conductive layers will also approach zero. Whether the voltage between the conductive layer 24 and the conductive layer region 26A, across the width of the electrochromic device 20 extending between the bus bars 40, 42, will become equal or substantially equal to a constant, such as about the applied voltage, in the fully colored state, thereby ultimately yielding a relatively uniform coloration in the electrochromic device 20, however, depends in part upon the width of the conductive layer 24 and the conductive layer region 26A of the electrochromic device 20 extending between the bus bars 40, 42 across which the current flows and the magnitude of the leakage current through the device.

In large sized electrochromic devices having a construction similar to that of the device 20, where the current flows a relatively large distance, such as in excess of about 40 inches, across the conductive layers of the electrochromic device between the opposing bus bars, non-uniform coloration of the device may persist even at full coloration, because a large and non-uniform voltage drop occurs through the stack across the width of the conductive layers extending from the opposing bus bars. This non-uniform voltage drop is caused by the effects of leakage current through the device, which is typically present in electrochromic devices because of the thin-film construction of the layers of the stack. Leakage current flows through the stack, such that a potential difference variation is created across the width of the electrochromic device extending between the bus bars. If the leakage current is significantly large, the potential difference variation becomes sufficiently large to cause a non-uniform coloration in the electrochromic device that may be visible to the naked eye. The non-uniform coloration in the electrochromic device typically results in a lighter area near a region midway between the opposing bus bars ("middle region"), than at regions of the electrochromic device near the bus bars. In other words, the middle region of the electrochromic device does not experience the same color change, or the same amount of darkening or consistency of darkening, as those regions closer to the bus bars at the sides of the electrochromic device. It is has been observed that when electrochromic devices constructed similar to the device 20 are operated at normal operating voltages, such as between around 2.5V and 4.0V, the leakage current is on the order of 50-500 mA/m$^2$, such that non-uniform coloration across the electrochromic device may become visible to a naked eye when the distance between the opposing bus bars is at least about 30 inches. For typical leakage current levels, color non-uniformity is not readily apparent to the naked eye when the electrochromic device is in the fully colored state and has bus-bar separations less than about 30 inches.

Referring to FIG. 1A, it is highly desirable to position the bus bars 40, 42 very close to the sides 25, 27 of the device 20 to maximize the region of the device 20, which is between the bus bars 40, 42 and, thus, in which coloration can be controlled. Also, by positioning the bus bars near the sides of the device 20, the bus bars, which typically have a thickness of not more than about 0.25 inches, are not visible or are minimally visible, such that the device is aesthetically pleasing when installed in a typical window frame. Large sized electrochromic devices, in which the distance between the bus bars, which typically are at opposing sides of the device, is in excess of about 40 inches, are desirable for many applications, such as a window of an office building or a glass windshield of a car. Thus, in the operation of such large sized electrochromic devices, non-uniform coloration may occur due to the effects of leakage currents, as discussed above, which is not desirable.

One prior art approach for minimizing non-uniformity of coloration in a large sized electrochromic device is to include a bus bar at the central region of the device, in addition to the bus bars disposed at the opposing sides of the device, to form a so-called triple bus bar device. For example, referring to FIG. 2, an exemplary prior art device 200 may include a central bus bar 242 and bus bars 240A and 240B at the opposing sides ("outside bus bars"). The device 200 has a construction of two electrochromic devices 200A, 200B, each being of the type of device 20 shown in FIGS. 1A and 1B, which are connected in parallel, and where the central bus bar 242 is common to both of the electrochromic devices 200A, 200B. Referring to FIG. 2, a first device 20 is disposed adjacent to and in mirror image to a second device 20, such that the bus bars 42 of the respective first and second devices 20 contact each other. The adjacent bus bars 42 are formed into a single, central bus bar 242 of the device 200. The bus bar 242 is connected to the negative terminal of the source 22 for coloring, or alternatively the positive terminal of the source 22 for bleaching, and the bus bars 240A and 240B at the respective opposing sides of the device 200 are connected to the positive, or alternatively the negative, terminal of the source 22. The electrochromic device 200, thus, includes electrochromic devices 200A and 200B that operate in parallel.

If it is assumed that, in the device 200, the bus bars 240A and 240B are separated by the same distance W as the bus bars 40 and 42 of the device 20, each of the parallel devices 200A and 200B individually behaves as if it had a bus bar separation of W/2, leading to a relatively undetectable non-uniformity in the fully colored state. Therefore, when the same voltage is applied to the devices 20 and 200, the voltage difference between the conductive layers at the middle region of each of the devices 200A and 200B is increased in relation to that of the device 20, such that uniform or more uniform coloration may be achieved for the electrochromic device 200 as compared to the device 20 at the same applied voltage.

Although including a central bus bar in an electrochromic device, such as illustrated in the device 200, may result in more uniform coloration for a large sized electrochromic device, the construction of the device 200 with such central bus bar is not desirable. The central bus bar typically is relatively thick, such as about 0.25 inches, and extends across the middle region of the device, which may be a window of a building, thereby being visible to a naked eye as a dark line, which is not aesthetically pleasing. Such thickness of the central bus bar is typical because the central bus bar has to carry all of the current for both halves of the composite device. It is generally desirable, however, that the bus bars of the electrochromic device are deposited to have as narrow a width as possible, so as to allow them to be hidden, such as in the window frames when installed, as much as possible. Consequently, the bus bars themselves have a finite resistance, which may lead to voltage drops along their length during operation of the electrochromic device, which in turn may lead to an end-to-end non-uniformity if significant voltage is dropped in the bus bars themselves. The typical resistance of suitable bus-bar material may be as much as 0.1 Ohm/linear foot, which may lead to significant resistance, and hence voltage drop, when the device is operated to change its optical properties ("switching") and current is flowing along the length of the bus-bars. In the case of the triple bus bar device, the center bus bar has to carry current for both halves of the device, and therefore will yield twice the voltage drop if it is the same width as the outside bus-bars. In order to minimize the voltage drop, and hence the end-to-end non-uniformity between outside bus bars, it is desirable to make the center bus bar wider than the outside bus bars. Widening the central bus bar, however, will result in an even more undesirable intrusion in the visible area of the electrochromic device.

Also, it has been observed that, in large sized electrochromic devices similar to the device 20, the regions of the device adjacent to the opposing bus bars change color or darken more quickly than at a middle region between the bus bars. Further, it has been observed that these same large sized electrochromic devices may change transmission state (or color) more slowly than electrochromic devices having smaller distances between opposing bus bars. This phenomenon is largely due to the current draw in the larger device being larger, and therefore leading to a larger voltage drop in the transparent conductor layers, thereby reducing the net potential applied to the stack relative to an electrochromic device having a smaller width between opposing bus bars. Also, the slower change in coloration is based, in part, on the application of a voltage to the electrochromic device which is below a maximum level, such as 3V, to avoid overdriving of the electrochromic device at the portions near the bus bars, which may cause damage to the layers of the stack. For example, for a prior art electrochromic device similar to the device 20 having opposing bus bars separated by about six inches, the typical time for the device to change from a full transmission state (fully clear) to a colored state where only five percent of light is transmitted through the device is about 100 seconds, whereas for an electrochromic device similar to the device 20 having bus bars separated by about thirty inches the typical time for obtaining the same coloration change may be about as much as 400 seconds.

Smaller voltage drops across the transparent conductive layers of an electrochromic device also may lead to more uniform coloration during coloration, as well as at full coloration. Therefore, the apparent non-uniformity seen during coloration will be less for an electrochromic device having a smaller width between opposing bus bars than that of a larger electrochromic device.

Therefore, there exists a need for an electrochromic device that is aesthetically pleasing, both in the fully colored state as well as during transition between the colored and clear states, may provide for uniform coloration where current flows over a relatively large distance through the conductive layers of the device, and may provide for a decrease in the time necessary to obtain a desired change in coloration.

SUMMARY OF THE INVENTION

In accordance with the present invention, these and other objects have now been realized by the discovery of an electrochromic device comprising first and second electrochromic regions which are electrically interconnected through a plurality of conductive links, which desirably are microscopic in size. In one embodiment, each of the first and second electrochromic regions includes five sequential layers including first and second conductive layers, an electrochromic layer, an ion conductor layer, and an anodic counter electrode layer. The first conductive layers of the first and second electrochromic regions are isolated from each other, and the second conductive layers of the first and second electrochromic regions are isolated from each other. The first conductive layer associated with the first electrochromic region is connected to a first bus bar, and the second conductive layer associated with the second electrochromic region is connected to a second bus bar. The plurality of conductive links divides the electrochromic device into the first and second electrochromic regions, and extends through the electrochromic layer, the ion conductor layer, and the anodic counter electrode layer. Each conductive link electrically interconnects a portion of the first conductive layer associated with the second electrochromic region with a portion of the second conductive layer associated with the first electrochromic region.

In accordance with aspects of the present invention, a method for preparing an electrochromic device includes providing a first conductive layer over a substrate, such as glass; depositing one of an electrochromic layer or a counter electrode layer to form a first electrode overlying the first conductive layer; depositing an ion-conductor layer over the first electrode; depositing the other of the electrochromic layer or the counter electrode layer to form a second electrode overlying the ion-conductor layer; and depositing a second conductive layer over the second electrode. The method further includes subdividing the first conductive layer into isolated first and second sub-regions, and subdividing the second conductive layer into isolated first and second sub-regions. In addition, the method includes forming a plurality of conductive links extending through the first and second electrodes and the ion conductor layer and interconnecting at least a portion of one of the first and second sub-regions of the first conductive layer with at least a portion of one of the first and second sub-regions of the second conductive layer.

In another aspect of the invention, a plurality of discrete electrochromic sub-devices may be formed on a substrate. Each discrete sub-device corresponds to a region of the substrate and includes a plurality of conductive links interposed between a pair of bus bars which are for connection to a selectively controllable electrical voltage source. The controllable voltage source is operable to selectively control the electrochromic sub-devices, as desired by a user, to cause desired coloration or no coloration of the regions of the substrate corresponding to the sub-devices.

BRIEF DESCRIPTION OF THE DRAWINGS

FIG. 3A is a top view of an electrochromic device, in accordance with an aspect of the present invention.

FIG. 3D is an enlarged view of a selected portion of the electrochromic device as shown in FIG. 3A.

FIG. 5 is a top view of an electrochromic device during its manufacture, in accordance with an aspect of the present invention.

FIG. 6 is a top view of an electrochromic device, in accordance with an aspect of the present invention.

FIG. 9 is a top view of another embodiment of an electrochromic device, in accordance with the present invention.

FIG. 10 illustrates a system including an electrochromic device, in accordance with the present invention.

DETAILED DESCRIPTION

In accordance with aspects of the present invention, an electrochromic device may provide for uniform coloration and reduced time for changing of color ("switching time") across the entirety or substantially the entirety of the device, where the device may be manufactured to have any desired configuration, including different shapes.

As described below, the shortcomings of the prior art associated with non-uniform coloration occurring in a large sized electrochromic device, or including a bus bar or an equivalent conductive element in a conspicuous region of a large sized electrochromic device, such as in a middle region of the device between bus bars extending along opposing sides of the device, to reduce or eliminate non-uniform coloration in the large sized electrochromic device, are overcome through the use of a plurality of conductive links that electrically interconnect the two conductive layers of the device. The links desirably are microscopic in size, may be arranged spaced from or in contact with an adjacent link, and may be located at a middle region of an electrochromic device. The plurality of links permits application of an increased voltage to bus bars at the opposing sides of the device, because the device will function as having two or more electrochromic regions that are electrically connected in series by the plurality of links. Thus, the entirety of the device, except for regions at which the links are formed, may be uniformly colored. As discussed below, an electrochromic device according to aspects of the invention may include more than two electrochromic regions electrically connected in series by one or more groups of a plurality of links.

Figure 3B:
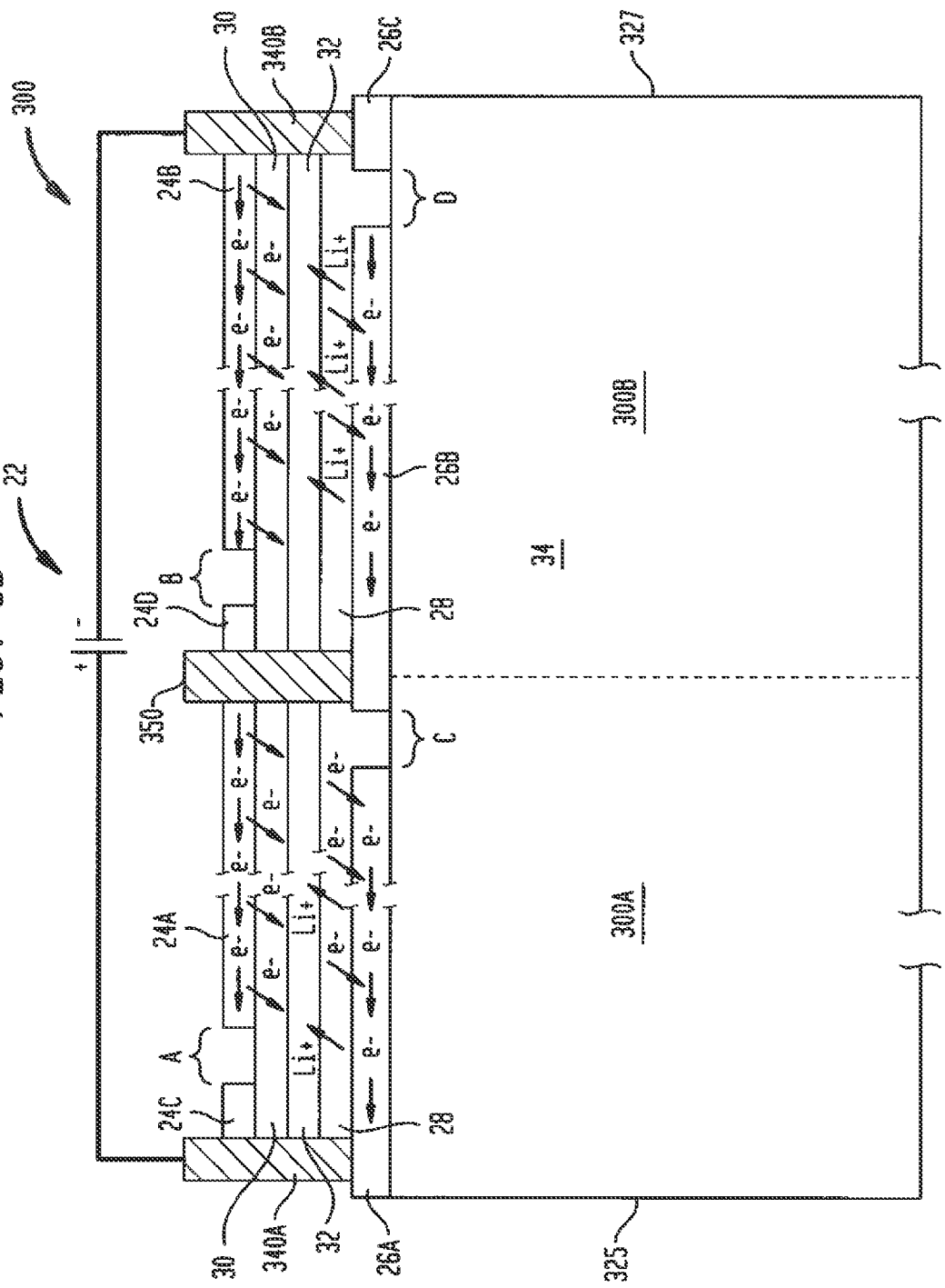
FIG. 3B is a view of the electrochromic device of FIG. 3A at cross-sectional line 3B-3B.
Figure 3C:
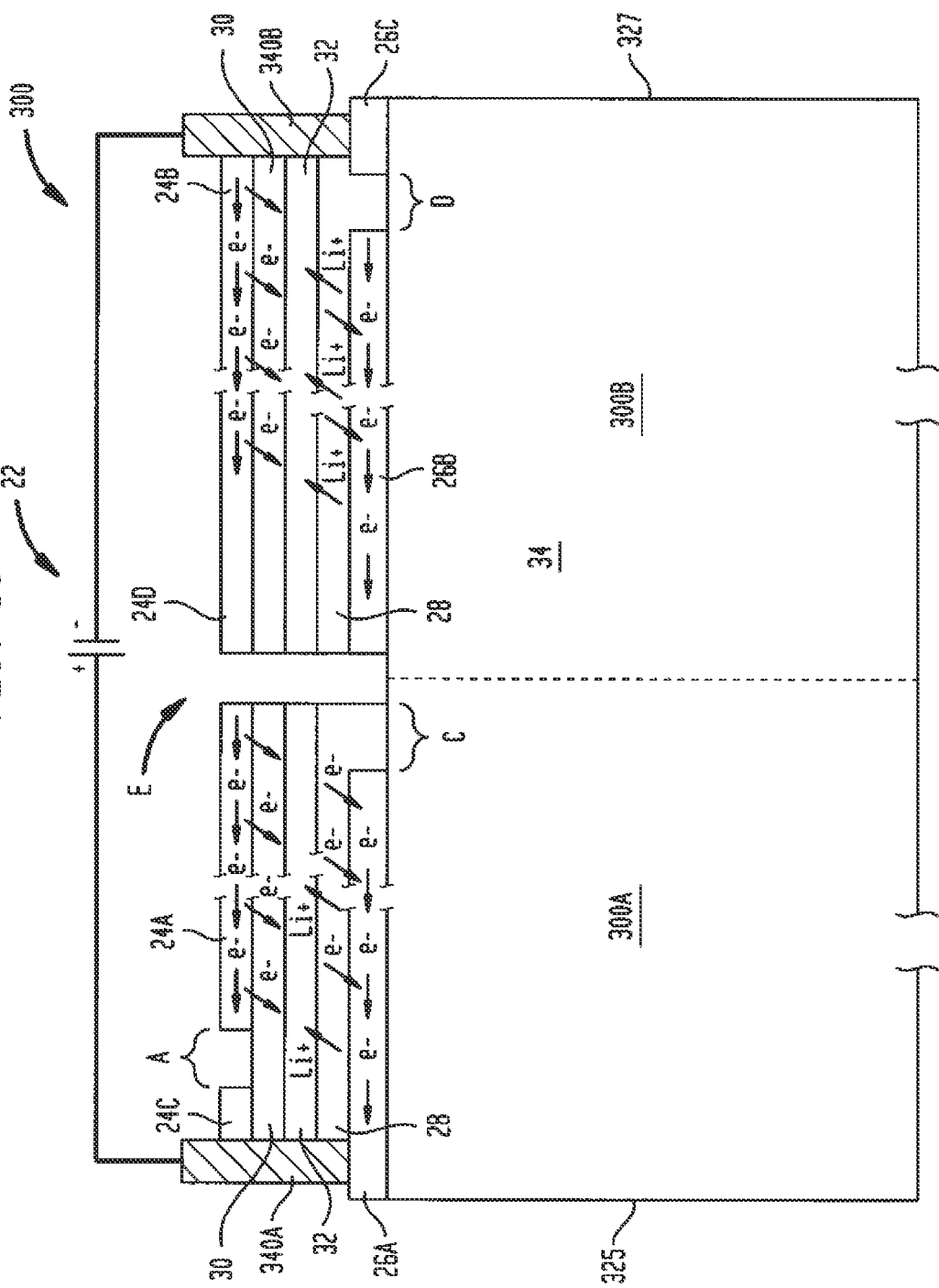
FIG. 3C is a view of the electrochromic device of FIG. 3A at cross-sectional line 3C-3C.
Figure 8:
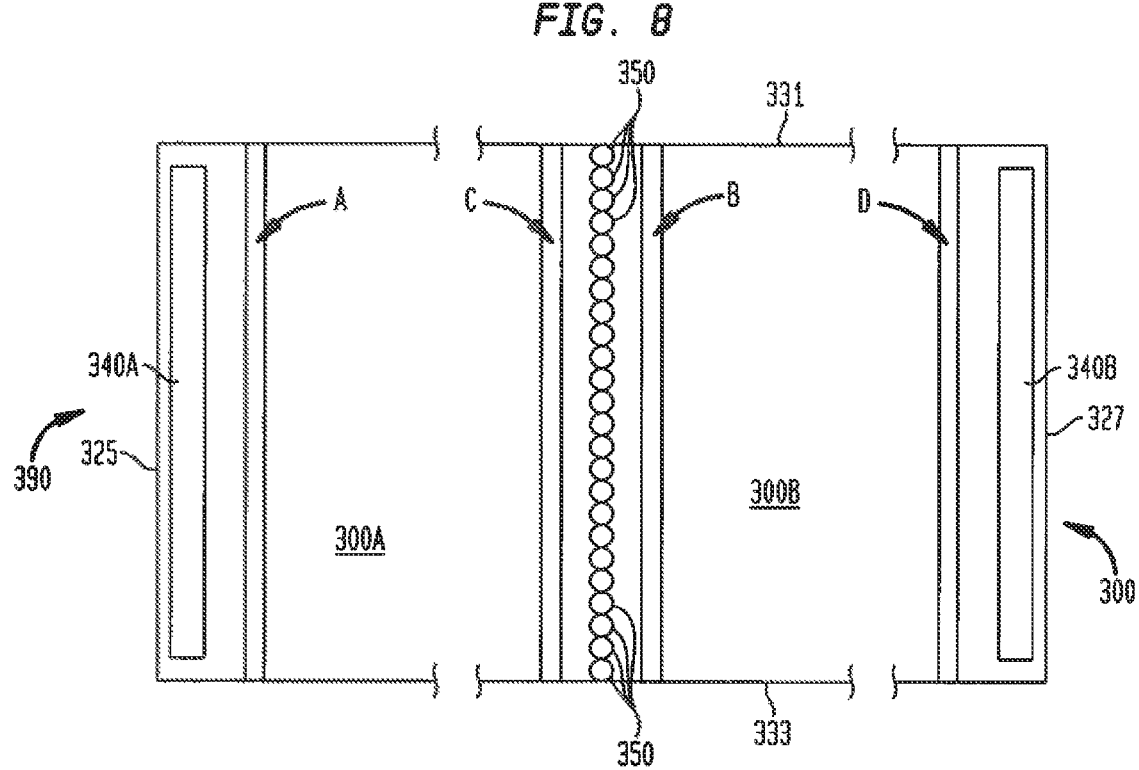
FIG. 8 is a top view of an electrochromic device, in accordance with an aspect of the present invention.

FIG. 3A is a top view, and FIGS. 3B and 3C are cross-sectional views of an exemplary electrochromic device 300, in accordance with aspects of the present invention. Referring to FIGS. 3A, 3B and 3C, the device 300 includes a substrate 34, conductive layer regions 26A, 26B and 26C which are physically isolated from one another, a counter electrode layer 28, an ion conductor layer 32, an electrochromic layer 30, conductive layer regions 24A, 24B, 24C and 24D which are physically isolated from one another, bus bars 340A and 340B, and a plurality of conductive links 350. In the exemplary embodiment of the device 300, the links 350 may be arranged so that adjacent links 350 are spaced from each other. In an alternative embodiment as discussed below in the text accompanying the description of FIG. 8, the links 350 may be arranged so that adjacent links 350 contact each other, so as to form a continuum of links 350 or a continuous conductive strip.

Referring to FIGS. 3A, 3B, 3C and 3D, the layer region 24B is physically isolated from the links 350, and the layer region 24A is physically isolated from the bus bar 340A. The layers 30, 32 and 28 extend continuously across the device 300, between opposing sides 325, 327 and sides 331, 333, except for the discontinuities in the layers 30, 32, 28 that exist at the links 350 and at portions E that are cut (removed) from the layers 30, 32, 28. The bus bar 340B is connected to the conductive layer regions 24B and 26C, and the bus bar 340A is connected to the conductor layer regions 26A and 24C. The conductive links 350 electrically interconnect the conductive layer regions 26B and 24A to each other. A low voltage electrical source 22 is connected to the bus bars 340A and 340B by means of conductive wires.

In a desired embodiment, the spacing between adjacent links 250 and the number of links 350 for the electrochromic device may be determined in accordance with the current expected to flow through the electrochromic device and the current capacity of the individual links 350, and for avoiding non-uniform current flow between the bus bars of the device. In addition, the number of links in the electrochromic device may be determined as a function of the peak current required to cause a change in color in the electrochromic device divided by the current conveying capacity of the individual links 350. In addition, there should be a sufficient number of links 350 so that a link 350 may be arranged sufficiently near an adjacent link 350 to provide that current flows from the bus bars to the links 350 in a direction that is substantially perpendicular to the bus bars, thereby avoiding any non-uniformity that may result from current flowing to each link in a direction not substantially perpendicular to the direction along which the bus bars extend.

In another embodiment of the device 300 where the distance between the bus bars 340 is approximately 50 inches, the length of each of the bus bars is about 50 inches, a peak current of approximately 500 mA is required to cause a change in coloration, and each link 350 is capable of conveying a current of about 10 mA, the device 300 may include 50 links 350 where each link 350 is spaced about 1 inch from an adjacent link 350.

The materials from which the layers 24, 26, 30, 32 and 28 in the device 300 are formed, and also their thicknesses, are well known in the art and may be as described, for example, in U.S. Patent Application No. 2008/0169185, incorporated by reference herein.

The bus bars 340 may be formed from a variety of conductive materials, such as silver, gold or copper. These materials may be applied using a variety of standard methods which are well known within the art, such as silk-screening, direct dispense, ink-jet printing, thick film printing, sputtering, plating and application using conductive adhesive tape. In one embodiment, the bus bars 340 may comprise silver frit and be about 25 um thick and about 0.25 inches wide.

The links 350 may include an electrically conductive material, such as a metallic deposit such as silver, which is diffused through the layers of the device 300 to cause the conductive layer regions 24A and 26B to become electrically interconnected.

In an alternative embodiment, the links 350 may be formed as result of reducing the layers 28, 30, 32 to their metallic conductive forms, such as by means of laser processing, chemical processing or another localized method.

In another embodiment, the link 350 is a small particle of silver forming a silver frit. In a further embodiment, the link 350 may have a diameter of between about 1 micron and 50 microns. In still another embodiment, the link 350 is of sufficient diameter to carry a current of between about 10 mA and about several hundred mA. In a further embodiment, each link 350 is spaced about one inch from an adjacent link 350.

Figure 1A:
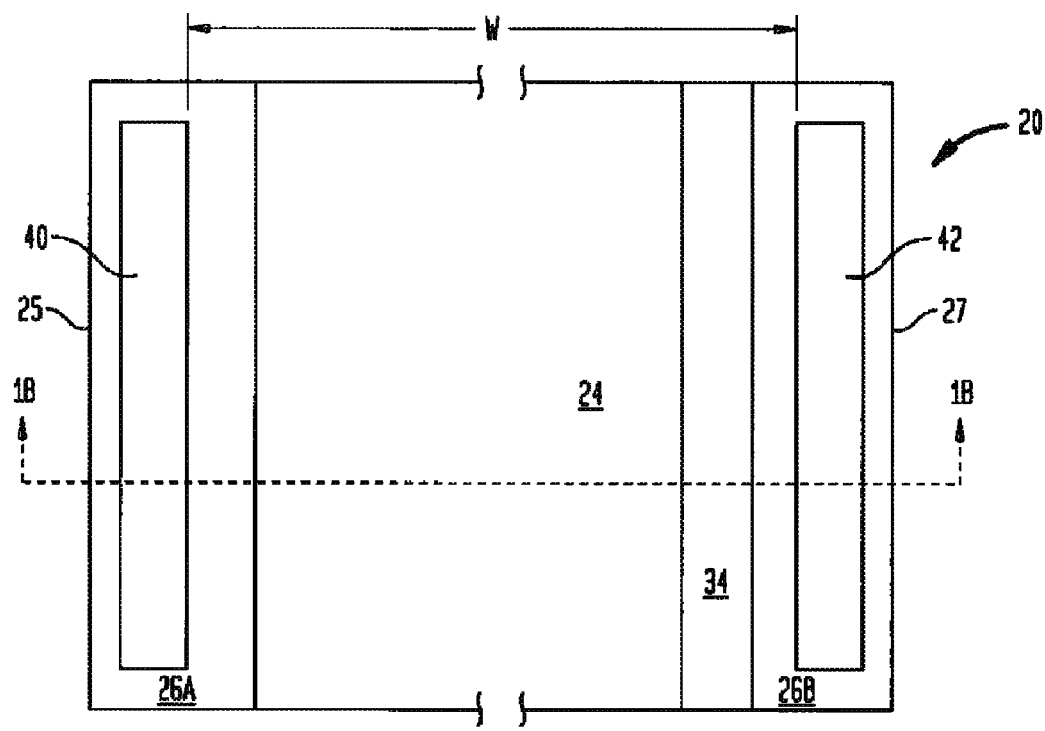
FIG. 1A is a top plan view of a prior art electrochromic device.
Figure 1B:
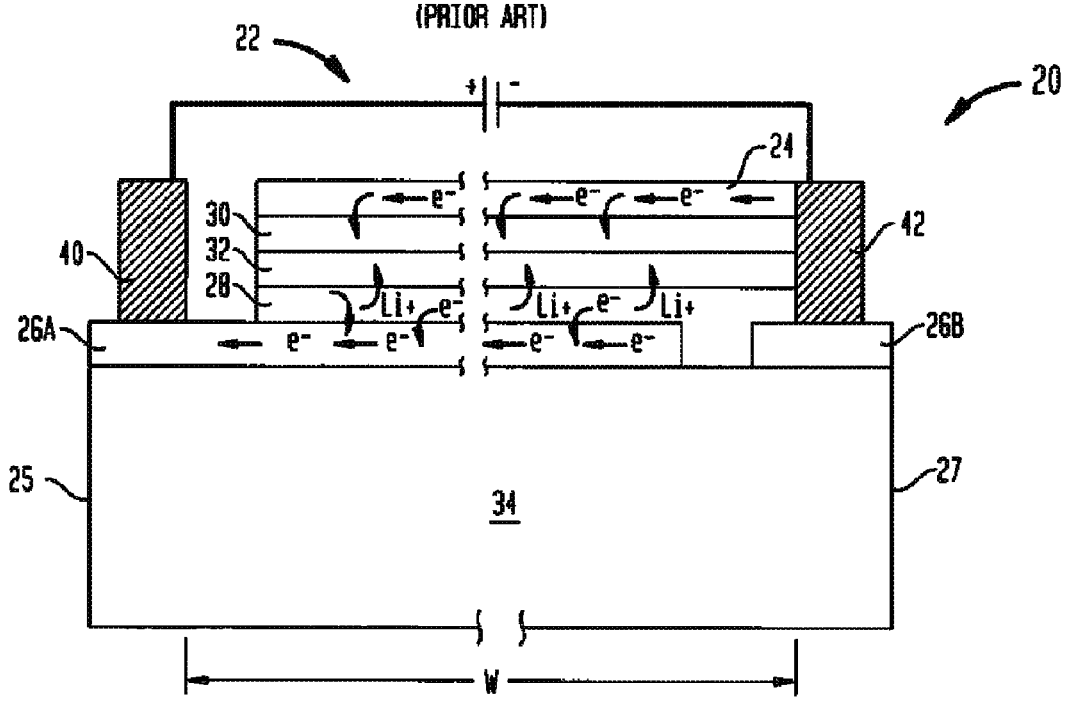
FIG. 1B is a view of the electrochromic device of FIG. 1A at cross-sectional line 1B-1B.
Figure 2:
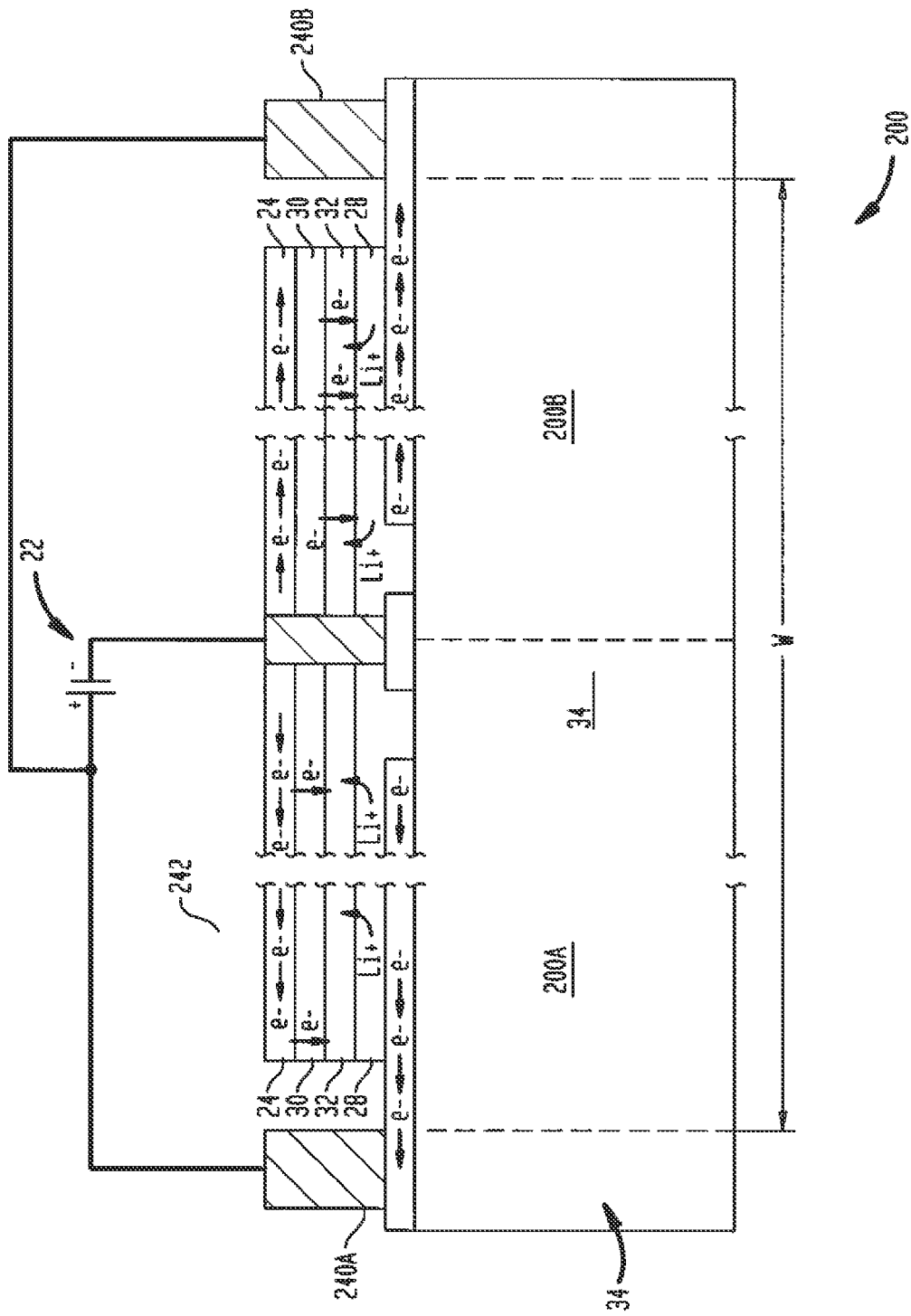
FIG. 2 is a cross-sectional view of another prior art electrochromic device.

Referring to FIGS. 3A, 3B and 3C, the electrochromic device 300 may be operated to change its coloration as follows. A voltage from the source 22 is applied across the bus bars 340A and 340B to create an electric potential between the bus bars 340A and 340B. Based on the creation of the electric potential between the bus bars 340, electrons (current) may flow in the conductive layer region 24B, in a manner similar to the flow in a prior art device, such as the device 20 of FIG. 1, from the point of contact between the bus bar 340B and the conductive layer region 24B and in the direction of the links 350. The electrons flowing in the layer region 24B are prevented from directly reaching the links 350 from the layer region 24B, because the layer region 24B is physically isolated from the links 350. Consequently, current from the bus bar 340B in the region 24B flows downwardly through the layers 30, 32 and 28 to the layer region 26B and is directed towards the links 350 via the layer region 26B. Such current flow in the regions 24B and 26B may provide that ions, such as Li+ ions, flow from the portion of the counter electrode layer 28 in contact with the region 26B, through the adjoining region of the ion conductor layer 32 and to the adjoining region of the electrochromic layer 30 which is in contact with the conductive layer region 24B, thereby causing such region of the electrochromic layer 30 to transform to a colored state. In addition, based on the creation of the electric potential across the bus bars 340, electrons (current) may flow in the conductive layer region 24A from the plurality of links 350 and in the direction of the bus bar 340A, and electrons will flow in the conductive layer region 26A in the direction of the bus bar 340A. Such electron flow in the regions 24A and 26A may provide that ions flow from the portion of the layer 28 in contact with the region 26A, through the adjoining region of the ion conductor layer 32 and to the adjoining region of the electrochromic layer 30 which is in contact with the conductive layer region 24A, thereby causing such region of the electrochromic layer 30 to transform to a colored state. The links 350, due to their size, exhibit a maximum of conductance, such that additional voltage drop in the device 300 at the region of the links 350 may be neglected.

Therefore, the device 300 includes two electrochromic regions 300A and 300B electrically connected in series through the plurality of links 350. The region 300A includes the layered structure between the conductive layer regions 24A and 26A, and the region 300E includes the layered structure between the conductive layer regions 24B and 26B. If it is assumed that the distance over which current flows ("flow distance") in the conductive layers 24 and 26 of the device 300 is substantially the same as the flow distance for the conductive layers of a prior art electrochromic device of the type of the device 20 shown in FIG. 1, twice the voltage may be applied across the bus bars 340A, 340B of the device 300 than can be applied to the device 20, without damaging the components of the device 300. Advantageously, by applying an increased voltage to the device 300 during operation of the device 300, the same coloration may be obtained in the middle region of the device 300 between the bus bars 340A and 340B as at other regions of the device 300, such as adjacent the bus bars 340A and 340B. The uniform coloration of the electrochromic device 300, based on an increase in the applied voltage, is obtained because the voltage drop across the device 300, which may result from leakage of current from the conductive layer regions 24 and 26 through the layers 30, 32 and 28, is minimized as the distance between effective bus bars for the electrochromic regions 300A and 300B is reduced.

For example, if 3 volts is the maximum voltage that can be applied to the device 20 without causing damage to its components, the device 300, which is constructed with substantially the same materials and has substantially the same thickness and dimensions as the device 20, may have a maximum applied voltage of 6 volts. Based on the construction and materials of the device 300, the application of 6 volts across the bus bars 340 of the device 300 may provide for uniform coloration at all regions of the device 300.

Further, an increase in the voltage applied to the inventive electrochromic device advantageously may increase the speed with which the coloration of the device may be switched. The switching speed may be higher in the inventive electrochromic device, because there is less voltage dropped across the width of the conductive layer regions 24 and 26 extending between the voltage sources, which in turn provides that the voltages of the conductor layer regions adjoining the layers 28, 32 and 30 are maintained at higher levels. For example, assuming the device 300 has the same distance across which current flows in the conductive layers as in the device described above, the increased switching speed in the device 300 may be equal to the switching speed that can be achieved in a prior art electrochromic device similar to the device 20 having a current flow distance that is one-half the flow distance of the electrochromic device 300.

Although the links 350 are shown linearly aligned in the illustrated embodiment of the electrochromic device 300, it is to be understood that the links 350 may be arranged in an arcuate configuration or any desired configuration. For example, if an electrochromic device of the present invention is formed on a glass substrate having curved sides, the links 350 may be arranged in a configuration that conforms to the curvature of one or more of the sides of a substrate at which the bus bars of the device, which are for connection to a low voltage electrical source, are disposed.

Figure 4A:
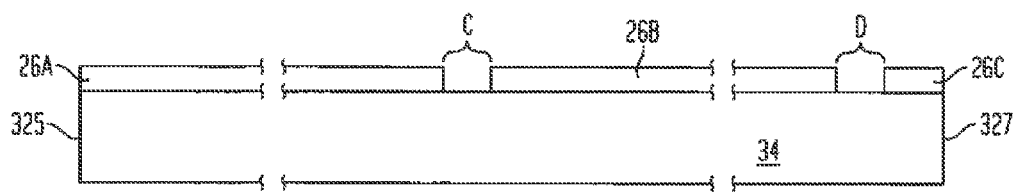
FIGS. 4A-4C are cross-sections of the electrochromic device of FIG. 3A during its manufacture.
Figure 4B:
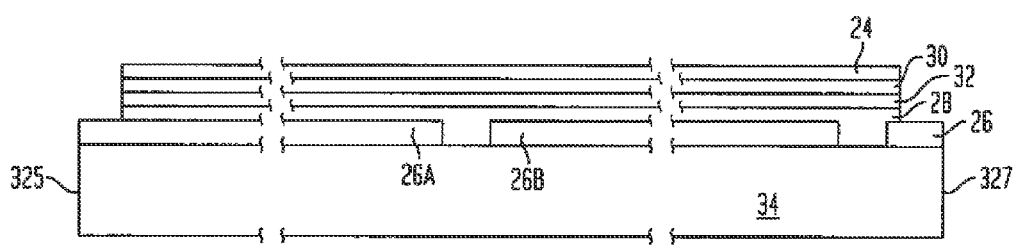
Figure 4C:
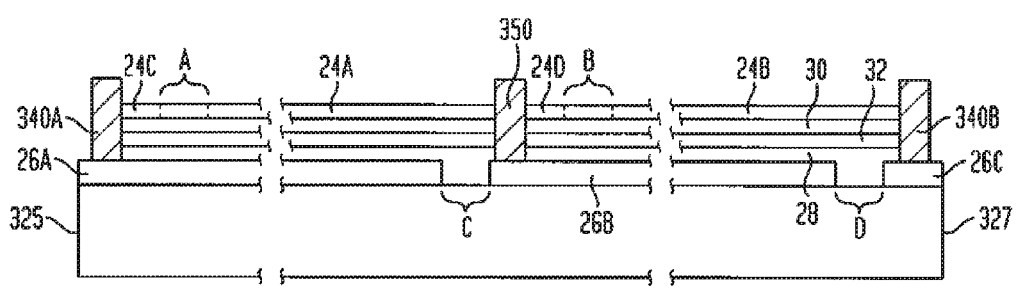
Figure 7A:
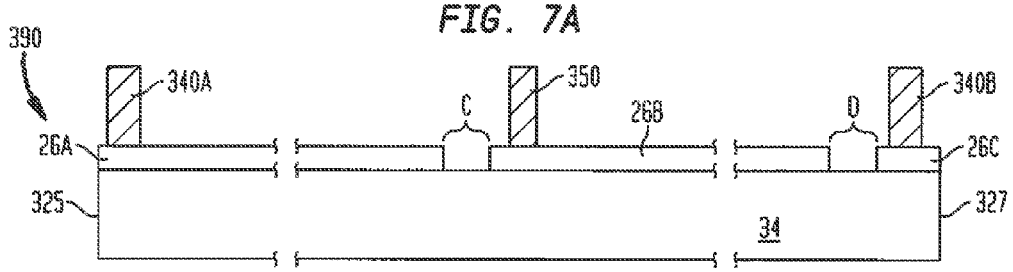
FIGS. 7A-7C are cross-sections of an electrochromic device during its manufacture, in accordance with an aspect of the present invention.
Figure 7B:
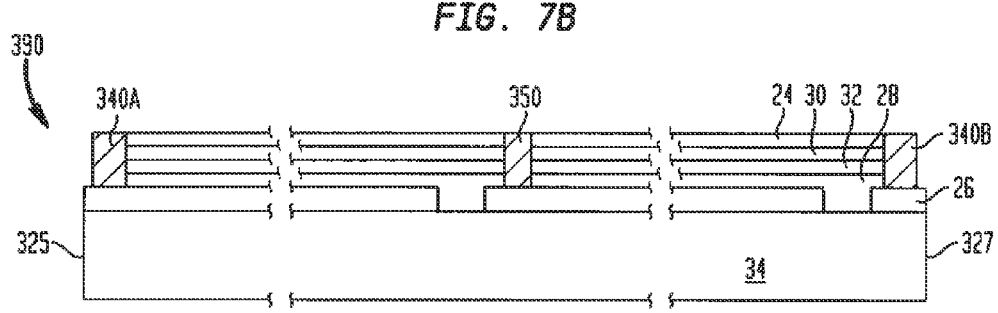
Figure 7C:
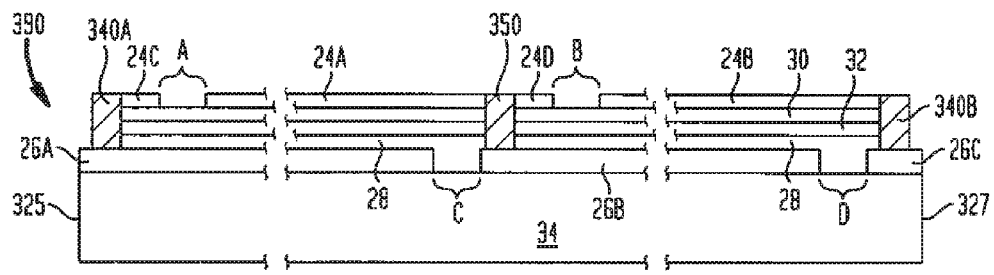

FIGS. 4A-4C illustrate exemplary stages of preparation of the electrochromic device 300, in accordance with aspects of the present invention, to provide that the electrochromic device is formed from two electrochromic regions electrically connected in series. It is to be understood that the process described below may be adapted to produce an electrochromic device including more than two electrochromic regions electrically connected in series, in accordance with aspects of the invention.

Referring to FIG. 4A, and also FIGS. 3A, 3B, 3C and 3D, a first conductive layer 26 is deposited on a substrate 34 extending between sides 325 and 327 of the device 300, by methods known in the art and in accordance with the desired properties of a conductive layer such as described in U.S. Pat. No. 7,372,610, incorporated by reference herein. Portions of the layer 26 may then be selectively removed by laser scribing, etching, mechanical abrading or other suitable removing processes known in the art ("cutting"). The cutting may be performed through the layer 26 to form an aperture or cutaway portion D extending from the side 331 to the side 33, so as to form the isolated layer region 26C extending from the side 327 and which is isolated from the remainder of the layer 26. In addition, cutting may be performed through the layer 26 to form substantially semi-circularly shaped apertures or cutaway portions C. The semi-circular portions C are arranged to partially surround respective links 350 that are formed spaced from each other, as discussed below. Referring to FIGS. 3A, 3B and 3D, the formation of the cutaway portions C exposes the substrate 34 and provides that the isolated layer region 26B may be subsequently formed and be disposed between the isolated layer region 26A and the isolated layer region 26C.

In an alternative embodiment, the portions of the layer 26 may be selectively removed by cutting to form the isolated layer regions 26A, 26B and 26C at any point in the process after deposition of the first conductive layer 26, but before deposition of a second conductive layer 24. For purposes of illustration, in the fabrication process described below, cutting of the first conductive layer 26 is performed to form the cutaway portions C and D immediately after its deposition.

A counter electrode layer 28, which includes complementary electrochromic material and is formed from well known materials, such as described in U.S. Pat. No. 7,372,610, incorporated by reference herein, is then deposited on the conductive layer regions 26 and the exposed portions of the substrate 34, desirably by sputtering.

An ion conductor layer 32, the materials of which are well known in the art, such as described in U.S. Pat. No. 7,372,610, incorporated by reference herein, is then deposited on the electrode layer 28, such as through wet chemical methods, chemical vapor deposition and/or physical vapor deposition, such as sol-gel, metallo-organic decomposition, laser ablation, evaporation, e-beam assisted evaporation, sputtering, intermediate frequency reactive sputtering, RF sputtering, magnetron sputtering, DC-sputtering, PVD and CVD and the like, and most desirably by DC-sputtering.

Then, an electrochromic layer 30, the materials of which are well known in the art, such as described in U.S. Pat. No. 7,372,610, incorporated by reference herein, is deposited on the ion conductor layer 32 through wet chemical methods, chemical vapor deposition and/or physical vapor deposition, such as sol-gel, metallo-organic decomposition, laser ablation, evaporation, e-beam assisted evaporation, sputtering, intermediate frequency reactive sputtering, RF sputtering, magnetron sputtering, DC sputtering, PVD and CVD and the like, and most desirably by DC-sputtering.

A second conductive layer 24 is then deposited on the electrochromic layer 30 by methods well known in the art, resulting in the structure shown in FIG. 4B. The second conductive layer 24 desirably is made from the same or similar materials as the first conductive layer 26.

In one embodiment, cutting may be performed, such as by use of a suitable masking, scribing or etching processes that utilize one or more of a laser, a mechanical abrasion process involving, for example, use of a diamond, ruby or stainless steel tip, or chemical etching, to form a cut through the layers 24, 30, 32, and 28, to expose the conductive layer 26B and, thus, allow a contact to be made to the conductive layer 26B. Referring to FIG. 4C, conductive material, such as including metal, to form the links 350 may be deposited into the cut by, for example, additive direct dispense techniques, ink-jet printing, screen printing plating techniques such as electrodeless plating or electroplating, physical deposition techniques such as evaporation, sputtering or laser ablation, where masking is suitably provided to avoid the conductive material from being deposited onto undesired regions. The links 350 thus formed are in contact with the conductor region 26B, such that the links 350 may serve as a current path from the conductor region 26B to the conductive layer region 24A to be formed from the conductive layer 24, such as described below.

In one embodiment, cuts may be formed through the layers 24, 30, 32, and 28 to expose the conductive layer 26B, such that the links 350 may constitute a series of discrete and very small regions, such as between about 10-100 microns in diameter, which are practically invisible to the naked eye, and desirably are spaced from each other.

In a further embodiment, the links 350 may be formed without depositing any material. In this embodiment, the conductive layer region 24 and the layer region 26B are electrically shorted together at discrete spaced regions, for example, by applying a predetermined amount of laser energy to fuse discrete portions of the layer 24 and the layer region 26B together, without ablating the material of the layers 24 and 26. In one embodiment, the links 350 may be formed using a long wavelength laser that causes an electrical short to form through the layers 30, 32, 28.

In another embodiment, discrete regions of the layer 24 and the layer region 26B may be fused together by applying localized thermal energy, such as obtained from a soldering iron.

In still another embodiment, the links 350 may be formed by means of a chemical process which acts to chemically reduce the oxide or nitride layers 24, 28, 30 and the layer region 26B, at discrete regions, to sub-oxide layers having conductive properties that are the same or similar to those of metals.

Further, additional metallic contacts, which may be formed by techniques similar to those used to form the links 350, may then be deposited or formed on the regions 26A and 26C at the ends 325 and 327, respectively, to form bus bars 340A and 340B, as shown in FIG. 4C.

In a further embodiment, conductive material may be deposited to form the links 350 and bus bars 340 before deposition of the layers 28, 32, 30 and 24. Such fabrication sequence, however, is less desirable, because of an increased likelihood that the conductive material, such as metallic particles, may become a part of the layers 28, 32, 30 and 24 during subsequent deposition of the layers 28, 32, 30 and 24, thereby causing defects which short out the electrical potential ("shorts").

In alternative embodiments, before, during or after formation of the bus bars 340, laser ablation or physical abrasion or a combination thereof may be performed, at a plurality of locations extending between sides 331 and 333 of the device 300, to remove vertically adjoining portions of the layers 24, 30, 32, 28 that overlie the region 26B and then conductive material may be deposited therein to form the links 350.

In one embodiment, the links 350 are formed at or about a midpoint between the sides 325 and 327.

It is to be understood that the links 350 may be arranged in a plurality of different geometrical configurations, where the links 350 electrically interconnect the layer regions 26B and 24A and are physically isolated from the layer regions 26A and 24B. Further referring to FIGS. 3A, 3D and FIG. 4C, after deposition of the conductor layer 24, and before or after formation of the links 350, cutting may be performed through only the layer 24 to form substantially semi-circularly shaped apertures or cutaway portions B arranged to oppose respective cutaway portions C. The semi-circular cutaway portions B are arranged to partially surround the links 350 and include end portions B1 that overlap underlying end portions C1 of the opposing cutaway portion C. The formation of the cutaway portions B exposes the layer 30.

Further, cutting may be performed through the entire stack, along a line extending from the side 331 to the side 333 and through the links 350, to form apertures or cutaway portions E that expose the substrate 34. The portions E effectively create a region in which the layer 24 has been removed and which interconnects an end portion C1 of a cutaway portion C at a first link with an adjacent end portion C1 of a cutaway portion C of another link adjacent the first link. Consequently, the portions E and C are formed as part of subdividing the layer 24 into the isolated layer regions 24A and 24B. In addition, regions E effectively create a region in which the layer 26 has been removed and which interconnects an end portion B1 of a cutaway portion B at a first link with an adjacent end portion B1 of a cutaway portion B of another link adjacent the first link. Consequently, the portions E and B are formed as part of subdividing the layer 26 into the isolated layer regions 26A and 26B. Referring to FIGS. 3A and 3D, the formation of the cutaway regions C and E exposes the substrate 34 and provides that the isolated layer region 26B is disposed between the isolated region 26A and the isolated region 26C. Based on the material from which the links 350 are formed and the cutting process used, the links 350 are substantially or completely unaffected by the cutting, so that the conductive path between the conductor layer regions 26B and 24A realized by the links 350 remains intact.

In another embodiment, referring to FIG. 5, cutting of the layer 26 may be performed, prior to cutting of the layer 24, to create cutaway portions C, similar to those described above, and also cutaway portions E1 at which the layer 24 also is removed and which interconnect an end portion C1 of a cutaway portion C at a first link with an adjacent end portion C1 of a cutaway portion C of another link adjacent the first link. Based on such cutting, the isolated layer region 26A, which is isolated from the isolation region 26B, is formed. Further in this embodiment, referring to FIG. 6, cutting may be performed after the layer 24 is deposited to form the cutaway portions B, similarly as described above, and cutaway portions E2 at which the layer 24 also is removed and which interconnect an end portion B1 of a cutaway portion B at a first link with an adjacent end portion B1 of a cutaway portion B of another link adjacent the first link. Based on such cutting, the isolated layer region 24B, which is isolated from the isolation region 24A, is formed. The cutaway portions E2 desirably substantially, and preferably exactly, overlap underlying portions E1, as shown in FIG. 6.

Referring again to FIGS. 3A, 3B and 4C, cutting may be performed to remove a portion A of the layer 24 extending lengthwise from the side 331 to the side 333 and adjacent to the bus bar 340A. In one embodiment, the portion A extends parallel to the bus bars 340. The removal of the portion A of the layer 24 results in the formation of the isolated conductive layer region 24C which is in contact with the bus bar 340A and isolated from the layer region 24A. The formation of the cutaway portions A, B and E or E2, in combination, results in the subdivision of the layer 24 to form the isolated conductive layer region 24B, which is in contact with the bus bar 340B and extends from the bus bar 340B in the direction of the links 350, and the isolated conductive layer region 24D, which is in contact with the links 350 and isolated from the regions 24B and 24A.

In an alternative embodiment, the device 300 may be completed by heating the entire electrochromic device in a vacuum, an inert atmosphere, or an atmospheric oven.

FIGS. 7A-7C and FIG. 8 show an exemplary electrochromic device 390, in accordance with another aspect of the invention. Like reference numerals are used to describe elements in the device 390 that are the same as those elements contained in the device 300, as described above. The device 390 may be fabricated by selectively depositing conductive material on the layer 26 to form the bus bars 340 and the links 350. The deposition of conductive material may be performed before or after deposition of the conductive layer 24 over the layer 26. In the electrochromic device 390, the individual links 350 are arranged so that adjacent links 350 contact each other and form a continuum of the links 350 or conductive strip that extends between the side 331 and the side 333. In one embodiment, cuts may be selectively formed through the layers 24, 30, 32, and 28 of the device 390 to expose the conductive layer region 26B, and the adjacent links 350 contact each other to form a thin stripe, about 10 microns in width, extending aligned, such as parallel, with the portion D of the layer 26 removed for sub-dividing the layer into isolated regions. For example, cutting may be performed, immediately following deposition of the layer 26, to create cutaway portions C and D that extend from the side 331 to the side 333 to form the isolated regions 26A, 26B and 26C. After formation of the layers 28, 32, 30 and 24 over the layer 26, cutting is performed only through the layer 24 to create cutaway portions A and B that extend from the side 331 to the side 333, so as to form the isolated regions 24A, 24B, 24C and 24D.

In an alternative embodiment of the electrochromic device 390, the portions A and B of the layer 24 are selectively removed so that the conductive layer 24 is not present between the portion A and the bus bar 340A and between the portion B and the links 350.

It is to be understood that the position of the counter electrode layer 28 and the electrochromic layer 30 may be reversed in the overall structure of the electrochromic device, such as presented in FIG. 3A. One skilled in the art would appreciate that should the layers be reversed, the method of manufacturing the device does not change with regard to the steps that have to be performed to generate each layer. Regardless of the order of steps performed to form an electrochromic device employing the aforementioned complementary counter electrode, the device may still be subjected to the heat treatment process described herein.

Thus, the conductive links of the inventive electrochromic device, such as the device 300, advantageously form an electrical connection between first and second electrochromic regions 300A and 300B of the electrochromic device, which desirably is essentially invisible to a naked eye and also exhibits a minimum of resistance, such that there is little, if any, additional voltage drop at the links. Further, the links permit application of an increased electrical potential between the opposing bus bars of the electrochromic device, because the device effectively includes two electrochromic regions electrically connected in series, thereby providing for uniform coloration of the device where the device has a construction requiring current to flow a large distance, such as at least about 40 inches, across the conductive layers.

In one embodiment, an electrochromic device may be sub-divided into more than two distinct but serially electrically connected electrochromic regions to provide that the overall electrochromic device may change color at the rate of the individual electrochromic regions into which the device is sub-divided. For example, an electrochromic device 500, which is constructed with substantially the same materials and has substantially the same thickness and dimensions as the device 300, may include a plurality of link groups 502A, 502B and 502C, each including a plurality of links 503, such as shown in FIG. 9. The link groups 502 are disposed between bus bars 340A and 340B, and define four electrochromic regions 500A, 500B, 500C and 500D electrically connected in series. Each additional electrochromic region formed in the device 500 by the inclusion of an additional link group 502 causes an increase in the multiple of the driving voltage that may be applied to the bus bars 340 without damaging the components of the device 500. For example, by sub-dividing the electrochromic device 300 having a width of sixty inches into four, fifteen inch wide electrochromic regions to form the device 500, in accordance with aspects of the present invention, by including link groups 502 desirably equally spaced across the distance between the sides 325 and 327 of the device 500, the maximum voltage that may be applied to the device 500 can be increased to four times the maximum voltage that can be applied to an electrochromic device having a construction similar to the prior art device 20, thereby causing the device 500 to change color at the rate of a prior art electrochromic device which is one-quarter of the width of the device 500. For example, if 3 volts is the maximum voltage that can be applied to the prior art electrochromic device 20 having a sixty inch width without causing damage to its components, the device 500 may have a maximum applied voltage of four times the maximum voltage of the device 20, or 12 volts, which increases switching speed to change coloration of the device 500 as if the device 500 was four distinct, fifteen inch wide electrochromic devices 20. In addition, by arranging the link groups 502 of the device 500 so that the widths of the electrochromic regions 500A, 500B, 500C and 500D are equal or substantially equal, the voltages across the stack in each of the electrochromic regions are equal or substantially equal, such that the electrochromic device 500 may have uniform coloration when in the fully colored state.

In one embodiment of the electrochromic device 500, the distance between adjacent link groups 502 may differ, such that the widths of the electrochromic regions 500A, 500B, 500C and 500D may be different from one another. In this embodiment, during operation of the device 500, the voltage drops may be in a sequence between the opposite sides 325, 327 of the device 500, such as 3V, 2.8V, 2.6V and 2.4V, such that in the fully colored state the device 500 may include gradations of color similar to a shade band. For example, an electrochromic device similar to the device 500 having more than two series electrically interconnected electrochromic regions, in accordance with the present invention, may be incorporated into a window, to provide that a first or upper region may be colored darker than lower regions when the device is in the fully colored state.

FIG. 10 illustrates a system 600 for selectively controlling coloration of discrete regions of an electrochromic device 650, in accordance with aspects of the present invention. Referring to FIG. 10, the system 600 includes an input device 610, a controller 612, and a controllable power supply apparatus 614 including power connection lines 616 coupled to the device 650.

The input device 610 is a conventional device, such as a keypad, switch, etc., that may be operated by a user to generate control data. The control data may identify a discrete region or regions of the electrochromic device 650 that are to be colored or made transparent, and also the extent to which a discrete region or regions is to be colored. In one embodiment, the device 610 may be included within a communication unit, such as described in U.S. Pat. No. 7,133,181, incorporated by reference herein.

The controller 612 is a conventional data processing device including a processor and a memory for storing data and instructions executable by the processor. The controller 612 is adapted to process control data supplied by the input device 610 and, based on the control data, generate and supply to the power apparatus 614 electrochromic device coloring data. The coloring data indicates which region or regions of the device 650 is to be colored or made transparent, and also the amount of voltage to be supplied across the region or regions. In one embodiment, the controller 612 may have the same or similar functionalities of a microprocessor for controlling coloration of an electrochromic device which is described in U.S. Pat. No. 7,133,181, incorporated by reference herein.

The device 650 has a construction similar to that of the device 300 described above, except that all layers of the fabricated device 300 other than the substrate 34 have been removed along lines 610A and 610B which extend between the sides 325 and 327. The electrochromic device 650, hence, includes discrete, isolated electrochromic sub-devices 651A, 651B and 651C on the same substrate 34. Each of the sub-devices 651 includes bus bars 640 and 642 at the opposing sides 325, 327, respectively, and a plurality of spaced links 360 disposed in the middle region between the bus bars 640 and 642.

The controllable power supply apparatus 614 includes an electrical low voltage source (not shown) that may simultaneously provide a plurality of output voltages on pairs of power supply lines 616A and 616B, 616C and 616D and 616E and 616F. The power supply lines 616A and 616B, 616C and 616D, and 616E and 616F are respectively connected to the bus bars 640A and 642A, 640B and 642B, and 640C and 642C. The coloring data supplied by the controller 612 determines how much voltage, if any, is supplied on selected pairs of the lines 616A and 616B, 616C and 616D and 616E and 616F. The apparatus 614 may include driver circuits for generating output voltage under control of a microprocessor, such as described in U.S. Pat. No. 7,133,181, incorporated by reference herein.

In an exemplary operation of the system 600, a user enters at the input device 610 information indicating a region or regions of the device 650 that is to be colored or made transparent, and optionally the extent of coloration of a region or regions. The device 650, for example, may be a windshield of an automobile or a window of an office building. The regions of the device 650 that the user may enter information to control their coloration correspond to the regions of the device 650 co-extensive with the sub-devices 651A, 651B and 651C. Based on the information entered by the user, control data is generated at the input device 610 identifying a desired coloring or transparency of one or more of the sub-devices 651 and also, optionally, the extent of coloring or transparency for the one or more sub-devices 651. The control data is supplied from the input device 610 to the controller 612. The controller 612, in turn, processes the control data and then supplies coloring data to the power supply apparatus 614 which causes predetermined voltage(s) to be output on one or more pair(s) of the voltage lines 616, thereby selectively controlling the coloration of the regions of the device 600 respectively corresponding to the sub-devices 651A, 651B and 651C.

For example, the control data may indicate complete coloration of the region of the device 650 corresponding to the sub-device 651A, partial coloration of the region of the device 650 corresponding to the sub-device 651B, and no coloration (transparency) of the region of the device 650 corresponding to the sub-device 651C. The processor of the controller 612 executes instructions in the memory to process the control data, and generates coloring data for causing the power supply apparatus 614 to apply a first voltage across the lines 616A and 616B and, thus, across the bus bars 640A, 642A of the sub-device 651A; to apply one-half of the first voltage across the lines 616C and 616D and, thus, across the bus bars 640B, 642B of the sub-device 651B; and to not apply any voltage across the lines 616E and 616F and, thus, across the bus bars 640C, 642C of the sub-device 651C. Based on the voltages applied at the respective pairs of bus bars 640 and 642, the regions of the device 650 corresponding to the sub-devices 651A, 651B and 651C are completely darkened, partially darkened and transparent, respectively.

Thus, the system 600 may be operated to selectively control coloring of discrete regions of the device 650 that correspond to respective discrete electrochromic sub-devices 651 that are integrated into the same device 650. Advantageously, a large sized electrochromic device may include, in an integral unit, electrochromic sub-devices that are individually and selectively controllable to provide for desired coloration, or not, of selected regions of the device where the large sized device is aesthetically pleasing.

In a further embodiment, one or more of the electrochromic sub-devices 651 of the device 650 may include a more than two electrochromic regions, similar to the electrochromic device 500 as discussed above, and further the electrochromic regions may have different widths. The controller 612 may selectively control the sub-devices to cause different color bands to be produced in the one or more sub-devices 651.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An electrochromic device comprising:
   a first electrochromic region and a second electrochromic region, each of the first and second electrochromic regions including:
   a) a first electrode comprising one of a cathodic electrochromic layer or an anodic counter electrode layer;
   b) a second electrode comprising the other of said cathodic electrochromic layer or said anodic counter electrode layer;
   c) an ion conductor layer for conducting ions between said first and second electrodes;
   d) a first isolated conductive layer region; and
   e) a second isolated conductive layer region;
   wherein the first and second isolated conductive layer regions of the first electrochromic region are physically isolated, respectively, from the first and second isolated conductive layer regions of the second electrochromic region;
   wherein, in each of the first and second electrochromic regions, the first and second electrodes and said ion-conductor layer are sandwiched between said first and second isolated conductive layer regions; and
   a plurality of first conductive links dividing the electrochromic device into the first and second electrochromic regions and extending through the first and second electrodes and the ion conductor layer and interconnecting (i) at least a portion of the first isolated conductive layer region associated with the first electrochromic region with at least a portion of the second isolated conductive layer region associated with the second electrochromic region to form a first interconnection or (ii) at least a portion of the second isolated conductive layer region associated with the first electrochromic region with at least a portion of the first isolated conductive layer region associated with the second electrochromic region to form a second interconnection.

2. The electrochromic device of claim 1, further comprising:
   a first bus bar and a second bus bar, wherein, for the first interconnection, the first isolated conductive layer region associated with the first electrochromic region is connected to the first bus bar and the second isolated conductive layer region-associated with the second electrochromic region is connected to the second bus bar and, for the second interconnection, the second isolated conductive layer region associated with the first electrochromic region is connected to the first bus bar and the first isolated conductive layer region associated with the second electrochromic region is connected to the second bus bar.

3. The electrochromic device of claim 2, wherein, for the first interconnection, the first bus bar contacts the first isolated conductive layer region-a associated with the first electrochromic region and the second bus bar contacts the second isolated conductive layer region associated with the second electrochromic region and, for the second interconnection, the first bus bar contacts the second isolated conductive layer region associated with the first electrochromic region and the second bus bar contacts the first isolated conductive layer region associated with the second electrochromic region.

4. The electrochromic device of claim 1, further comprising:
   a third electrochromic region including:
   a) the first electrode, the second electrode and the ion-conductor layer;
   b) a first isolated conductive layer region; and
   c) a second isolated conductive layer region;
   wherein the first and second isolated conductive layer regions of the third electrochromic region are physically isolated, respectively, from the first isolated conductive layer regions of the first and second electrochromic regions and the second isolated conductive layer regions of the first and second electrochromic regions;
   wherein, in the third electrochromic region, the first and second electrodes and said ion conductor layer are sandwiched between said first and second isolated conductive layer regions; and
   a plurality of second conductive links along with the plurality of first conductive links dividing the electrochromic device into the first, second and third electrochromic regions, wherein the second conductive links extend through the first and second electrodes and the ion conductor layer, and interconnect
   for the first interconnection, (i) at least a portion of the first isolated conductive layer region associated with the first electrochromic region with at least a portion of the second isolated conductive layer region associated with the third electrochromic region or (ii) at least a portion of the second electrochromic region associated with the second electrochromic region with at least a portion of the first isolated conductive layer region associated with the third electrochromic region, and
   for the second interconnection, (i) at least a portion of the second isolated conductive layer region associated with the first electrochromic region with at least a portion of the first isolated conductive layer region associated with the third electrochromic region or (ii) at least a portion of the first electrochromic region associated with the second electrochromic region with at least a portion of the second isolated conductive layer region associated with the third electrochromic region.

5. The electrochromic device of claim 1, wherein adjacent ones of the first conductive links are spaced from each other.

6. The electrochromic device of claim 1, further comprising:
   a plurality of the first electrochromic regions interconnected with a respective plurality of the second electrochromic regions on a substrate, wherein each of the interconnected first and second electrochromic regions is an individually controllable electrochromic sub-device.

7. The electrochromic device of claim 1, wherein the plurality of first conductive links defines an arcuate portion.

8. The electrochromic device of claim 1, wherein adjacent ones of the first conductive links are in contact with each other.

9. A method for preparation of an electrochromic device comprising:
  a) providing a first conductive layer;
  b) depositing one of an electrochromic layer or a counter electrode layer to form a first electrode overlying the first conductive layer;
  c) depositing an ion-conductor layer over said first electrode;
  d) depositing the other of said electrochromic layer or said counter electrode layer to form a second electrode overlying the ion-conductor layer;
  e) depositing a second conductive layer over said second electrode,
  f) subdividing the first conductive layer into isolated first and second sub-regions of the first conductive layer;
  g) subdividing the second conductive layer into isolated first and second sub-regions of the second conductive layer; and
  h) forming a plurality of conductive links extending through the first and second electrodes and the ion conductor layer and interconnecting at least a portion of one of the first and second sub-regions of the first conductive layer with at least a portion of one of the first and second sub-regions of the second conductive layer.

10. The method of claim 9, wherein the first conductive layer overlies a substrate and the plurality of conductive links defines a nominal line or arc extending across a portion of the substrate, the method further comprising:
  i) removing the layers overlying the substrate along a removal line or arc intersecting the nominal line or arc of the links, such that at least one of the conductive links is on each side of the removal line or arc.

11. The method of claim 10, wherein the removal line and the nominal line are perpendicular to each other.

12. The method of claim 9, wherein at least one of the conductive links is formed by deposition of conductive material.

13. The method of claim 9, wherein at least one of the conductive links is formed by chemical processing.

14. The method of claim 9, wherein at least one of the conductive links is formed by thermal processing.

15. The method of claim 9, wherein at least one the conductive links is formed by subjecting at least one of the layers to optical radiation.

16. The method of claim 9, wherein adjacent ones of the conductive links are spaced from each other.

17. The method of claim 9, wherein the subdividing the first conductive layer into the first and second isolated sub-regions of the first conductive layer includes selectively removing a portion of the first conductive layer before the depositing of the second conductive layer.

18. The method of claim 9, wherein the subdividing the first conductive layer into the first and second isolated sub-regions of the first conductive layer includes selectively removing a portion of the first conductive layer after the depositing of the second conductive layer.

19. The method of claim 9, wherein the subdividing the second conductive layer into the first and second isolated sub-regions of the second conductive layer includes selectively removing a portion of only the second conductive layer.

20. The method of claim 9, wherein the subdividing the first conductive layer into the first and second isolated sub-regions of the first conductive layer and the subdividing the second conductive layer into the first and second isolated sub-regions of the second conductive layer include selectively removing a portion of each of the first conductive layer, the electrochromic layer, the ion conductor layer, the counter electrode layer and the second conductive layer.

21. The method of claim 9, wherein adjacent ones of the first conductive links are in contact with each other.

22. A system for controlling an electrochromic device comprising:
  a plurality of first electrochromic regions and a plurality of respectively corresponding second electrochromic regions forming the electrochromic device on a substrate, wherein each of the first and second electrochromic regions includes:
    a) a first electrode comprising one of a cathodic electrochromic layer or an anodic counter electrode layer;
    b) a second electrode comprising the other of said cathodic electrochromic layer or said anodic counter electrode layer;
    c) an ion-conductor layer for conducting ions between said first and second electrodes;
    d) a first isolated conductive layer region; and
    e) a second isolated conductive layer region;
  wherein the first and second isolated conductive layer regions of the first electrochromic regions are physically isolated, respectively, from the first and second isolated conductive layer regions of the second electrochromic regions;
  wherein, in each of the first and second electrochromic regions, the first and second electrodes and said ion-conductor layer are sandwiched between said first and second isolated conductive layer regions;
  a plurality of conductive links dividing the electrochromic device into the first and second electrochromic regions, extending through the first and second electrodes and the ion conductor layer and interconnecting (i) at least a portion of the first isolated conductive layer regions associated with the first electrochromic regions with respectively corresponding at least a portion of the second isolated conductive layer regions associated with the second electrochromic regions to form first interconnections or (ii) at least a portion of the second isolated conductive layer regions associated with the first electrochromic regions with respectively corresponding at least a portion of the first isolated conductive layer regions associated with the second electrochromic regions to form second interconnections;
  first bus bars and second bus bars, wherein, for the first interconnections, the first bus bars respectively contacting the first isolated conductive layers regions associated with the first electrochromic regions and the second bus bars respectively contacting the second isolated conductive layer regions associated with the second electrochromic regions, and for the second interconnections, the first bus bars respectively contacting the second isolated conductive layers regions associated with the first electrochromic regions and the second bus bars respectively contacting the first isolated conductive layer regions associated with the second electrochromic regions, wherein each of the interconnected first and second electrochromic regions is an individually controllable electrochromic sub-device; and means for selectively supplying electrical potentials respectively across the first and second bus bars of the plurality of the electrochromic sub-devices.

23. The system of claim 22 further comprising:

an input unit for supplying input information indicating at least one of the sub-devices and a desired color state for the at least one of the sub-devices; and a processor for receiving the input information and providing color control data to the electrical potential supply means.

24. The system of claim 22, where the plurality of links of at least one of the sub-devices defines an arcuate portion.

25. The system of claim 22, wherein the plurality of links of at least one of the sub-devices extends in a line substantially parallel to opposing bus bars of the one sub-device.

26. The system of claim 22, wherein at least one of the links is formed by laser or chemical processing.

* * * * *

UNITED STATES PATENT AND TRADEMARK OFFICE
CERTIFICATE OF CORRECTION

| | | |
|---|---|---|
| PATENT NO. | : 8,228,587 B2 | Page 1 of 1 |
| APPLICATION NO. | : 12/765224 | |
| DATED | : July 24, 2012 | |
| INVENTOR(S) | : Burdis | |

It is certified that error appears in the above-identified patent and that said Letters Patent is hereby corrected as shown below:

In the Specification

Column 9, line 61, "is" should read -- are --.
Column 14, line 65, "is" should read -- are --.
Column 15, line 51, "is" should read -- are --.
Column 16, line 17, "is" should read -- are --.
Column 16, line 66, delete "a".

In the Claims

Column 17, line 66, claim 3, delete "-a".
Column 19, line 47, claim 15, after "one" insert -- of --.
Column 20, line 45, claim 22, "regions" should read -- region --.
Column 20, line 65, claim 22, "layers" should read -- layer --.
Column 22, line 4, claim 23, "where" should read -- wherein --.

Signed and Sealed this
Tenth Day of February, 2015

Michelle K. Lee
*Deputy Director of the United States Patent and Trademark Office*